United States Patent
Krone et al.

(10) Patent No.: US 6,594,983 B1
(45) Date of Patent: Jul. 22, 2003

(54) CUTTING DEVICE FOR AN AGRICULTURAL HARVESTER

(75) Inventors: Bernard Krone, Spelle (DE); Christian Steglich, Freren (DE); Thomas Wernsmann, Emsdetten (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 0 days.

(21) Appl. No.: 09/744,060

(22) PCT Filed: Jul. 6, 1999

(86) PCT No.: PCT/EP99/04679

§ 371 (c)(1),
(2), (4) Date: Mar. 15, 2001

(87) PCT Pub. No.: WO00/03584

PCT Pub. Date: Jan. 27, 2000

(30) Foreign Application Priority Data

Jul. 18, 1999 (DE) .......................... 198 32 463

(51) Int. Cl.[7] .............................................. A01D 50/02
(52) U.S. Cl. ........................................... 56/341; 56/504
(58) Field of Search .................. 56/341, 500, 502, 56/504; 460/112; 100/88, 91

(56) References Cited

U.S. PATENT DOCUMENTS 4,955,188 A * 9/1990 von Allworden .............. 100/6
5,974,776 A * 11/1999 Prellwitz ................. 460/112

FOREIGN PATENT DOCUMENTS

| DE | 3213199 C1 * | 1/1985 | .......... A01D/90/04 |
| DE | 4302199 A1 * | 7/1994 | .......... A01D/90/04 |
| EP | 0341508 | 11/1989 | |

OTHER PUBLICATIONS

Derwent abstract of DE 3213199 C.*
Derwent abstract of DE 4302199A1.*

* cited by examiner

Primary Examiner—Thomas B. Will
Assistant Examiner—Meredith Petravick
(74) Attorney, Agent, or Firm—Jordan and Hamburg LLP (57) ABSTRACT

A cutting device for agricultural harvesting machines, such as, for instance, self-loading forage boxes or baling presses with a conveyor channel, in which a number of cutting blades mounted in rotatable fashion, arranged at least in a single row and protruding into the conveyor channel in a cutting position interact with a driven rotating conveyor mechanism equipped with conveying prongs and aligned along a horizontal axis crosswise to the travel and work direction for the purpose of cutting stalk products. A support mechanism provides elastic support to each individual cutting blade in the cutting position, and a control device releases the support mechanism, thereby allowing all or a number of cutting blades to rotate into a non-cutting position. A support and control member mounted in rotatable fashion and aligned about an axis parallel to a rotation axis of the corresponding cutting blade is assigned to each cutting blade for the purpose of providing elastic support to each individual cutting blade in the cutting position and for allowing the cutting blade to rotate out of the cutting position into a non-cutting position.

63 Claims, 7 Drawing Sheets

CUTTING DEVICE FOR AN AGRICULTURAL HARVESTER

BACKGROUND OF THE INVENTION

This invention relates to a cutting device for agricultural harvesting machines such as, for instance, self-loading forage boxes or baling presses for harvesting agricultural stalk or leaf products such as grass or hay. Numerous versions of such cutting devices are known in the art. Essentially, they comprise a conveying mechanism driven in rotating fashion around a horizontal axis and equipped with conveying prongs, which works in conjunction with cutting blades protruding into a conveying channel to cut the stalk or leaf product taken up by a pick-up mechanism and to conduct it to a subsequently positioned loading chamber. Especially in baling presses for the production of round or cube-shaped crop bales, the mounting space available for installing such cutting devices is very limited.

German patent DE 31 41 414 A1 discloses a cutting device for a self-loading forage box, in which each knife blade is held in its cutting position by means of a spring-elastic blade lever, allowing it to yield automatically to a stone or other foreign object. The blade levers are mounted approximately in the middle to a fixed shaft, and the segment turned towards the blade, to which a blade roll is mounted, locks into a recess in the back of the blade, and the other segment, equipped with cam plates, locks into the control shaft positioned subsequently to the blade levers. The cam plates, one of which being assigned to each blade lever and therefore to each blade, are mounted to the control shaft in staggered fashion in such a way that either all, a certain number or none of the blade levers lock into a cam plate for setting the cutting length of the cutting device. This cutting device exhibits the disadvantage, first of all, that the installation of the blade levers and the subsequently positioned control shaft consumes considerable mounting space, adversely affecting the ground clearance of the agricultural harvesting machine. Secondly, such great force is required to activate the control shaft and therefore to set the cutting length that it is not possible for an operator to turn the control shaft by direct manual action. Instead, costly transmission gears or similar drive mechanisms are required.

Older German patent DE 32 13 199 C2 describes a self-loading forage box with a cutting device in which the cutting blades protruding into the conveying channel are held in the cutting position by means of support claws mounted to a control shaft in varying numbers in single rows running parallel to the axis. Supporting edges on the backs of the cutting blades lock into the support claws of the control shaft, forming an acute pressure angle, so that, whenever an excessive load is brought to bear upon one or more blades, the support claws move out of lock with the supporting edges of the cutting knives as the control shaft rotates away from the effect of the overload, thereby allowing the cutting blades to rotate out of the cutting position into a non-cutting position. A disadvantage of this cutting device consists in the fact that all activated cutting blades are allowed to rotate out of the cutting position whenever a stone or similar foreign object is encountered. Thus, it is not possible in this case either to protect individual cutting blades from overload and damage.

SUMMARY OF THE INVENTION

Therefore, an objective of the invention is to provide a cutting device for agricultural harvesting machines of the type mentioned above that would assure reliable protection of each individual cutting blade in a compact design requiring little installation space, is easy and inexpensive to produce, and for which an operator can set the cutting length with little expenditure of force.

In a cutting device for agricultural harvesting machines, such as, for instance, self-loading forage boxes or baling presses, the application of the invention-specific features assures reliable protection of each individual cutting blade, while the required installation room is kept to a minimum and therefore does not compromise the ground clearance even of baling presses and especially of baling presses for producing cube-shaped crop bales. This objective is accomplished by means of a support and control member assigned to each cutting blade, which, when set in one control position, provides elastic support for each individual cutting blade in a cutting position, and which, when set in another control position, allows the corresponding cutting blade to rotate out of its cutting position into a non-cutting position.

According to the invention, this objective is accomplished in that the rotatable support and control members mounted to an axis running parallel to the axis of the conveying mechanism features at least two control positions providing elastic support of the corresponding cutting blade in the cutting position, and one control position allowing the corresponding cutting blade to rotate out of the cutting position into the non-cutting position. When the support and control members are completely rotated, therefore, a control position is set in which all cutting blades are elastically supported in the cutting position, while in two other control positions, only every second cutting blade is set in the cutting position and elastically supported therein.

According to a further aspect of the invention, an intermediate position can be set between each control position. The purpose of this intermediate position is to allow all cutting blades to rotate simultaneously out of the cutting position into a non-cutting position. Thus, a joint rotation of the support and control members is required to switch between the different control positions, and the angle of rotation traversed in each such switch is equal to the angular pitch of the support and control members and is derived from the number of control positions. With three control positions, therefore, the angular pitch would be 120 degrees. The intermediate position between two control positions is attainable by jointly rotating the support and control members around an angle of rotation, the size of which corresponds to half the angular pitch.

Under an advantageous execution form, support rolls are assigned to the support and control members and interact with a backwards-supporting edge of the cutting blades to provide elastic support for the cutting blades. The number of support rolls for each support and control member is at least one less than the number of possible control positions. Under a preferred form of the execution, three control positions are provided, so that in two control positions, a support roll interacts with the backwards supporting edge of a cutting blade, while in the third control position, the absence of a support roll allows the cutting blade to rotate into a non-cutting position. The support and control members so designed are positioned in such a way that adjacent support and control members are staggered with respect to each other by an angular pitch.

According to a further aspect of the invention, the support and control members are mounted in rotatable fashion to a control shaft which runs crosswise to the direction of travel and work, so that the area of rotation of a support and control member, starting for instance from a stop mechanism designed as a spring-type dowel pin, works in opposition to the direction of force of an energy accumulator, here for instance a torsion spring. By mounting the support and control members to the control shaft in rotatable fashion, it is possible to provide elastic support to the cutting blades in the cutting position. When the cutting blade encounters a stone or similar foreign object, for instance, in the conveyer channel, it can therefore automatically rotate back out of the cutting position into a non-cutting position, as the corresponding support and control member on the control shaft, interacting with the backwards supporting edge of the cutting blade, is rotated back in opposition to the direction of force of the energy accumulator. Supported by the force of the energy accumulator, the cutting blade returns to the cutting position once the foreign object has passed through.

According to the invention, the cutting length for the harvest product can be changed in that the entire control shaft with all its support and control members is rotated and locked in place in the corresponding angular pitch. This process can easily be performed manually by an operator by means of a setting key provided for such purpose, for instance.

A detailed description of embodiments of the invention follow with reference to the following drawings.

DESCRIPTION OF THE PREFERRED EMBODIMENTS

Figure 1:
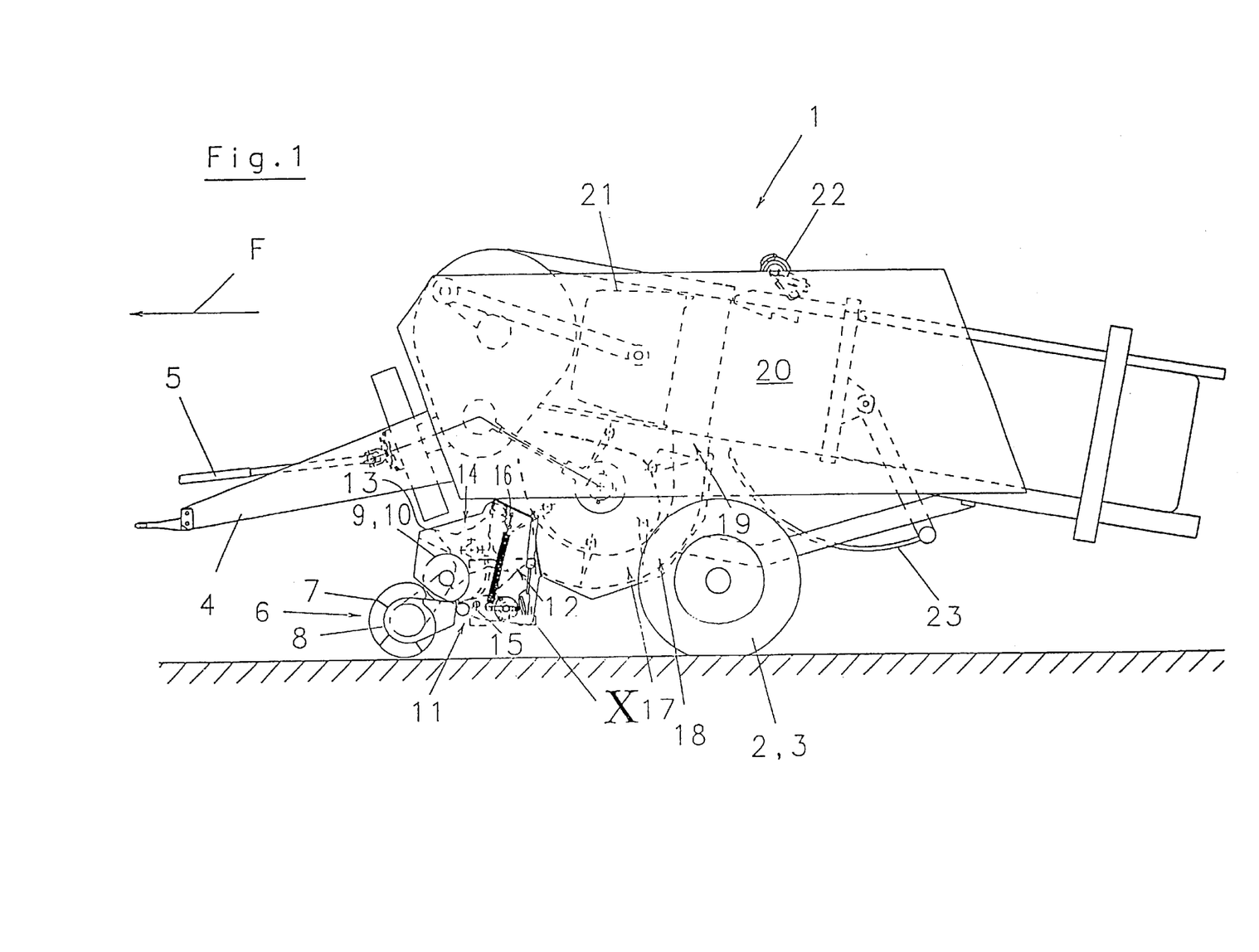
FIG. 1 is a whole side view of a baling press with a cutting device according to the invention.

The baling press 1 shown in FIG. 1, which can be moved across a field or meadow in the travel and work direction F, is supported on the ground by wheels 2, 3, and connectable to an agricultural tractor not shown in the figure by means of a tractor hitch 4, the power being supplied from the power take-off shaft of the tractor by means of a propeller shaft 5. The baling press is equipped with a pick-up mechanism 6, with which harvest products such as straw, hay or withered vegetation lying on the ground in windrows can be picked up off the field or meadow surface. In the illustrated execution example, the pick-up mechanism 6 is designed as a pick-up drum 8 of known design equipped with prongs 7 and transverse conveyor screws 9, 10, to reduce the width of the windrows taken up. To the pick-up drum 8 is connected, in the direction of flow of the harvest product, a cutting device 11, consisting essentially of a conveying mechanism 14 designed as a rotary conveyor and cutter, with conveyor prongs 13 protruding into a conveyor channel 12, as well as cutting blades 15 and scrapers 16 mounted between the cutting blades 15.

After the cutting device 11, the harvest product is conveyed from below into the baling channel 20 through a feed channel 18 and a baling channel intake opening 19 by means of a conveyor mechanism 17 designed as a rake conveyor, and a plunger piston 21 which moves back and forth compresses the harvest product into firm, cube-shaped crop bales. Once the harvest product bales have reached a pre-selected length, they are bound with binding material. To this end, counters 22, shown here only by suggestion, are used in conjunction with the required binding needles 23. In the illustrated execution example, the cutting device 11 according to the invention is used in a baling press for producing cube-shaped harvest product bales. Nonetheless, it is also conceivable to employ the cutting device 11 according to the invention in a baling press for the production of round bales or in a self-loading forage box.

Figure 2:
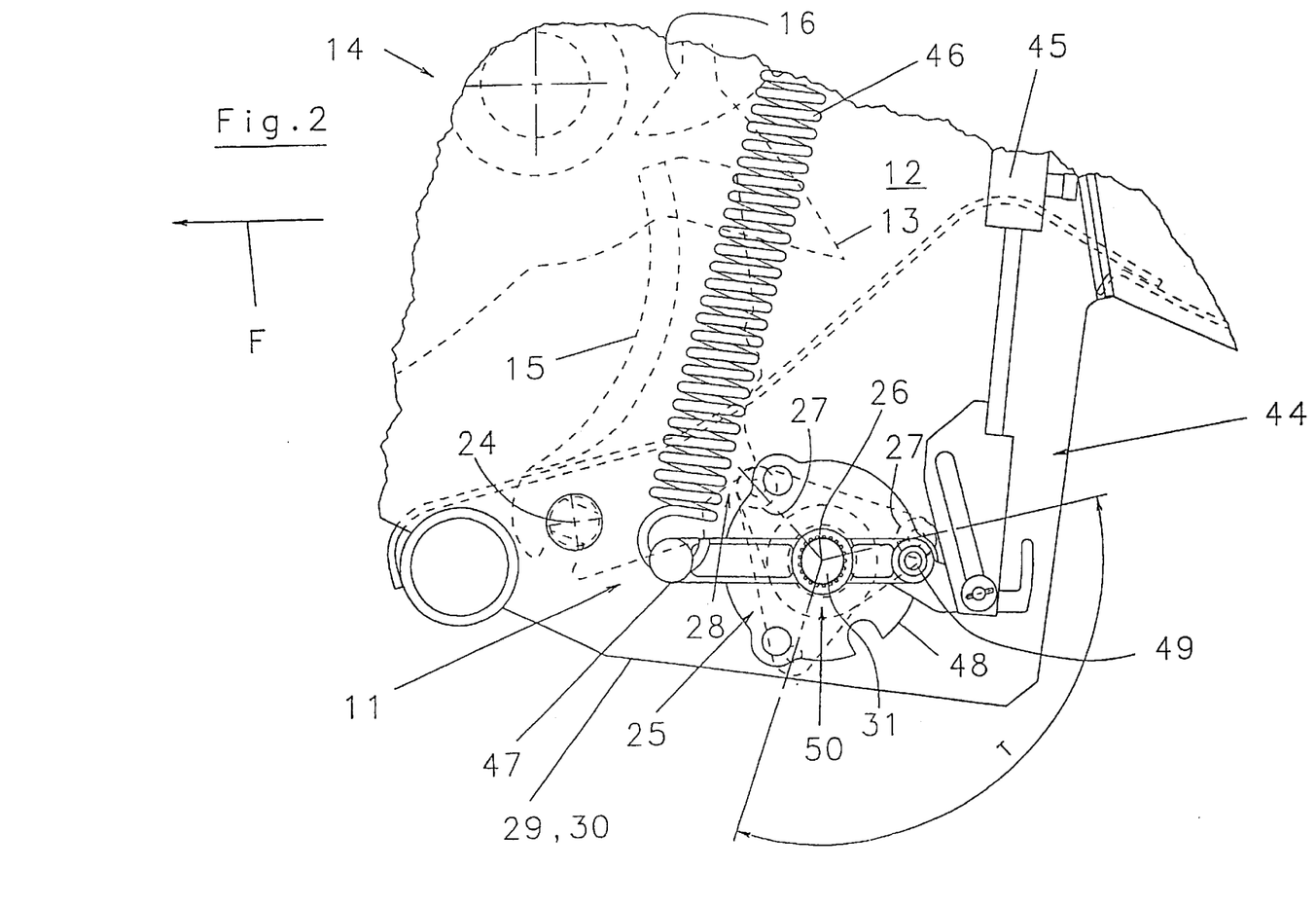
FIG. 2 is an enlarged, partially discontinuous view of the details X in FIG. 1.

FIG. 2 is an enlarged view providing a more detailed representation of the cutting device 11. As can be seen in the figure, a control and support member 25 mounted in rotatable fashion along an axis 26 which runs parallel to the rotation axis 24 of the cutting blades 15 is assigned to each cutting blade 15, which can be rotated around a horizontal rotation axis 24 that runs crosswise to the travel and work direction F out of a cutting position protruding into the conveyor channel 12 into a non-cutting position positioned below the conveyor channel 12, and back again. These support and control members 25 both provide elastic support to each individual cutting blade 15 in the cutting position and allow a selectable number of cutting blades (changing the cutting length of the cutting device 11) or all cutting blades (cutting blade 0 setting) to rotate out of the cutting position into the non-cutting position. To this end, each support and control member 25 features at least three control positions, separated from each other by an angular pitch T.

Figure 3:
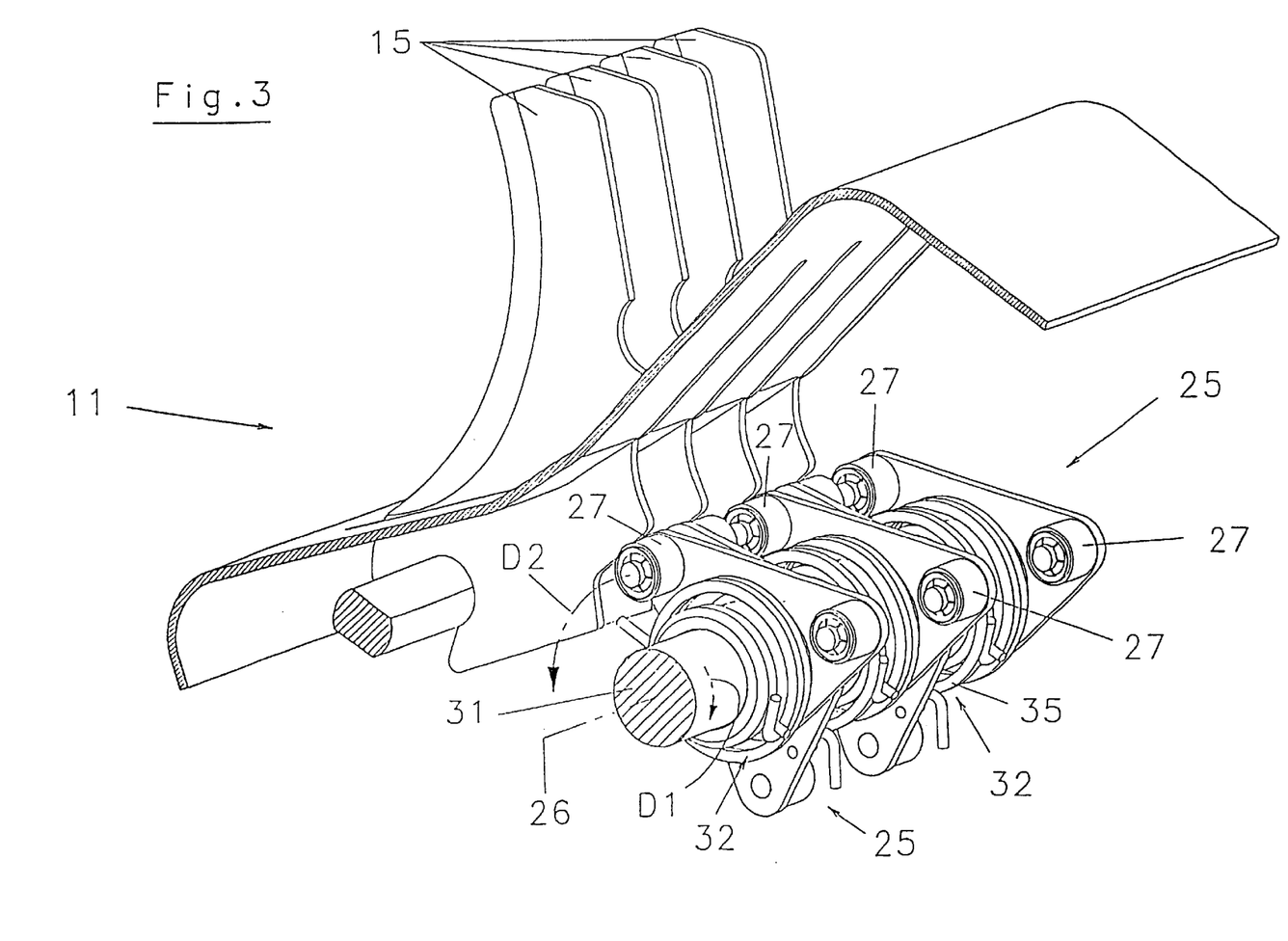
FIG. 3 is a perspective view of part of the cutting device with four cutting blades in a cutting position.
Figure 4:
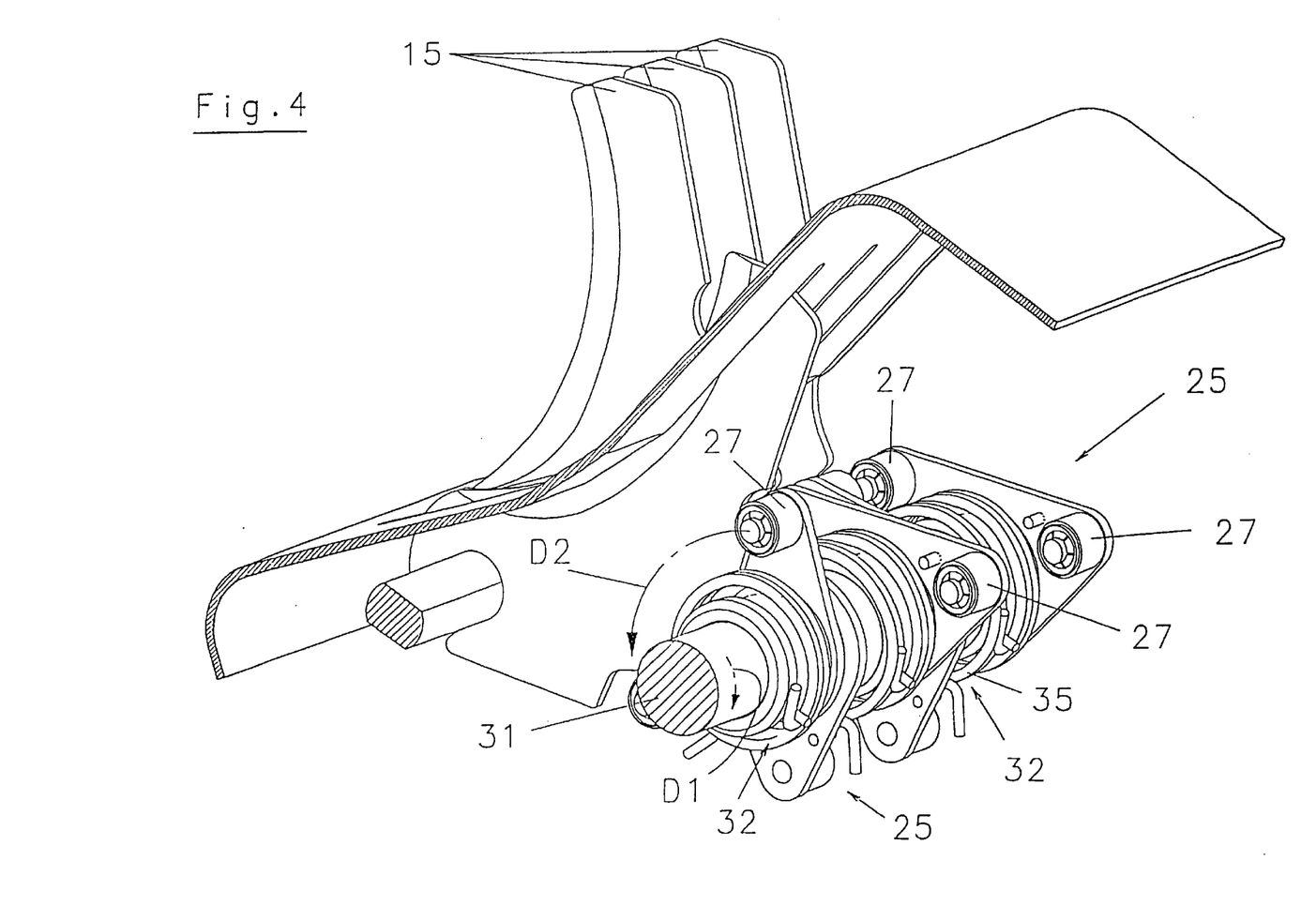
FIG. 4 is a perspective view of part of the cutting device with three cutting blades in a cutting position and a cutting blade in a rotated-back position, due to the occurrence of a foreign object.
Figure 5:
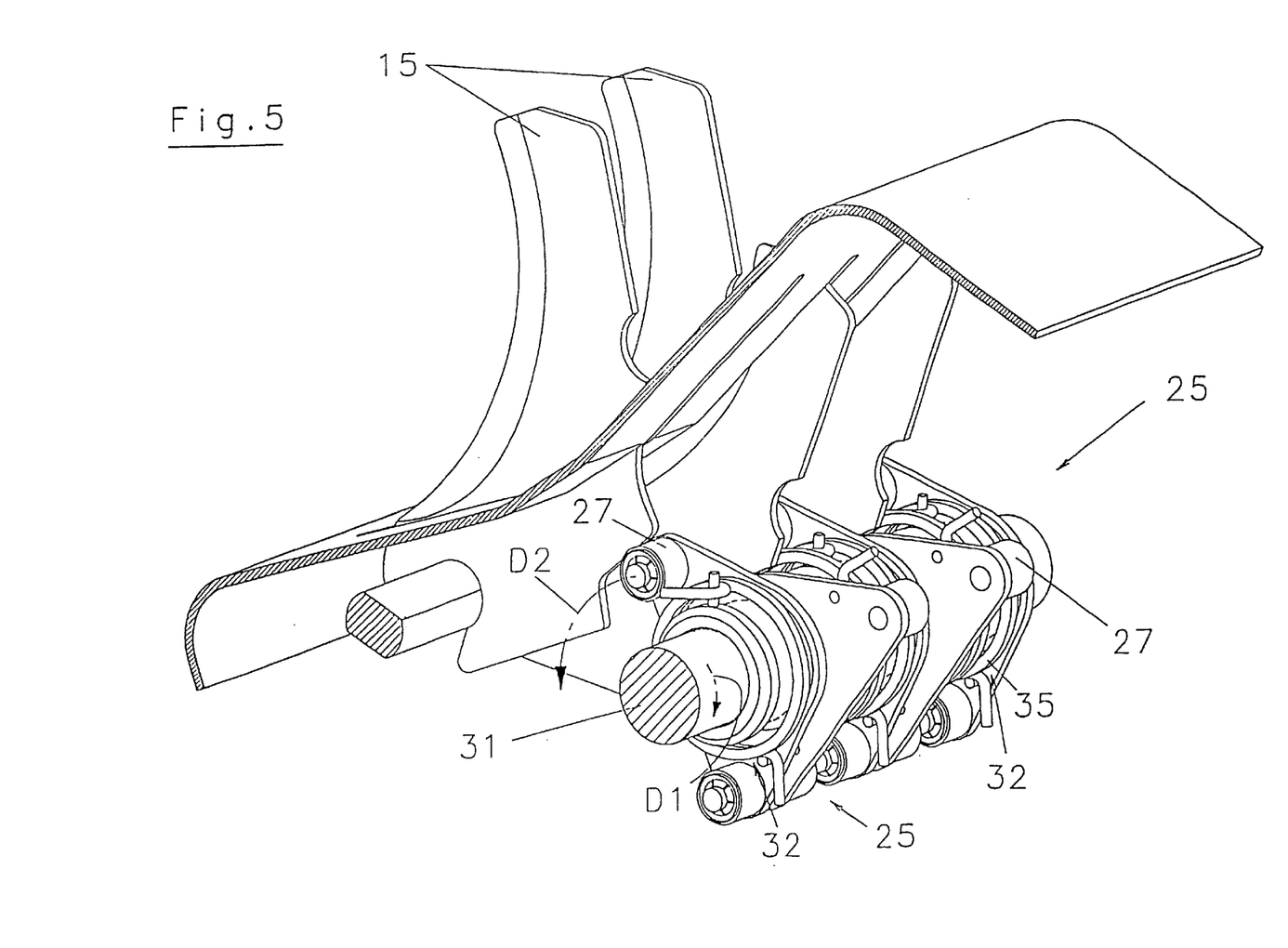
FIG. 5 is a perspective view similar to FIG. 3, in which, however, every second cutting blade is in a non-cutting position.

According to the invention, each support and control member 25 is designed in such a way that, in two out of the three control positions in the represented execution example, a support roll 27 is provided which interacts with a backwards supporting edge 28 of the cutting blade 15, so as to provide elastic support to the cutting blades 15 in the cutting position (see also FIGS. 3 through 5). In the third control position, due to the absence of the support roll 27 of the support and control member 25, one cutting blade 15 can be rotated without opposition from the cutting position into the non-cutting position. This effect is utilized for the purpose of placing either all or a selectable number of cutting blades 15 into the cutting position. With regard to the control position with the missing support roll 27, the invention provides that the support and control members 25 be mounted to a rotatable control shaft 31 housed in the side walls 29, 30, in such a way that adjacent support and control members 25 are staggered with respect to each other at an angular pitch T, which measures 120 degrees in the case of three control positions. In one control position (assuming three control positions), all cutting blades 15 will be set in the cutting position, due to the supporting effect of the support roll 27 of the support and control member 25, while in the two other control positions, only one half the cutting blades 15, respectively, are in the cutting position, causing, in conjunction with the conveyor mechanism 14, the harvest product to be cut in the conveyor channel 12. Thus, the manner of changing the cutting length with the cutting device 11 according to the invention described above is accomplished by means of rotating the control shaft 31, together with all the support and control members 25 mounted thereto, at the angular pitch T in a rotation direction D1. One of the last-named control positions is illustrated in FIG. 5.

As can be seen in FIG. 4, an intermediate position can be set between each pair of control positions of the support and control members 25. In this intermediate position, all cutting blades 15 can be moved simultaneously out of the cutting position into the non-cutting position. This intermediate position is also taken when one or more cutting blades 15 are rotated out of the cutting position, due for instance to a stone or similar foreign object in the conveyor channel 12. To this end, each support and control member 25 is connected elastically to the control shaft 31 by means of an energy accumulator 32, thereby allowing, by means of limited rotation in the rotation direction D2, the cutting blades 15 to rotate back as a necessary result of a foreign object in the conveyor channel 12. Once the foreign object has passed through, the support and control member 25 returns automatically to its starting position under the force exerted by the energy accumulator 32 by means of limited rotation in opposition to the rotation direction D2, as a result of which the cutting blades 15 are returned to the cutting position. Stop elements 33, designed in the represented execution example as spring-type dowel pins 34, are provided for determining the starting position of the support and control members 25. Under an advantageous execution of the invention, the energy accumulators 32 are designed as torsion springs 35 (see also FIG. 6).

Figures 6, 7:
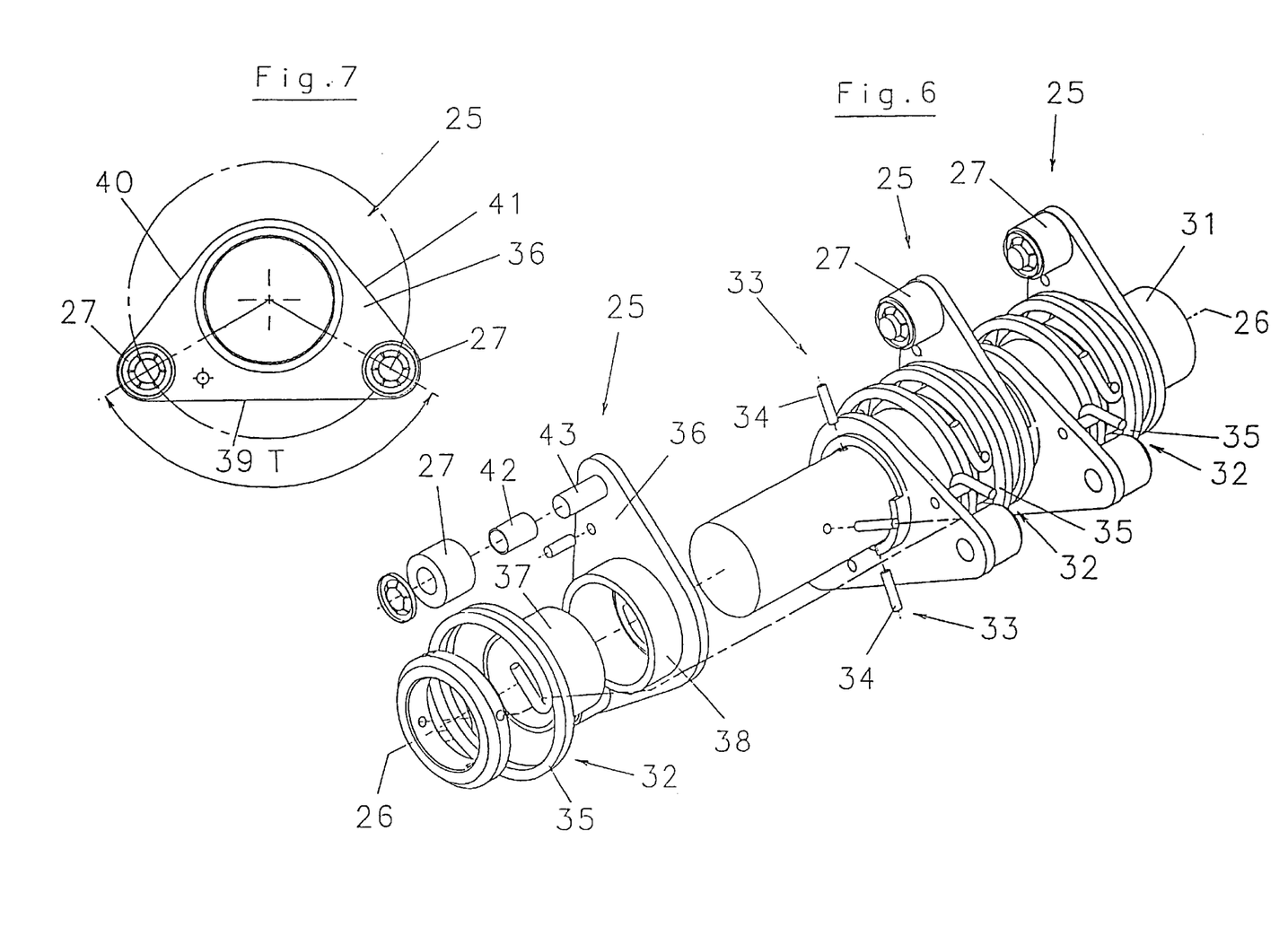
FIG. 6 is a perspective view of part of a control shaft of the cutting device with support and control members mounted to it.
FIG. 7 is a side view of a support and control member of the cutting device according to the invention.

As can also be seen in FIG. 6 and especially in FIG. 7, a support and control element 25 comprises a carrier segment 36 in the shape of an isosceles triangle (with rounded corners), which is mounted in a hub 38 on the control shaft 31 by means of a bearing bush 37, made of plastic, for instance. Under an advantageous execution of the invention, the support roll 27 is mounted in rotatable fashion to a stud bolt 43 by means of a bearing bush 42 in the area of the angle between the base side 39 and the respective lateral sides 40, 41, while the hub 38 is positioned in the area of the angle between the lateral sides 40, 41.

Figure 8:
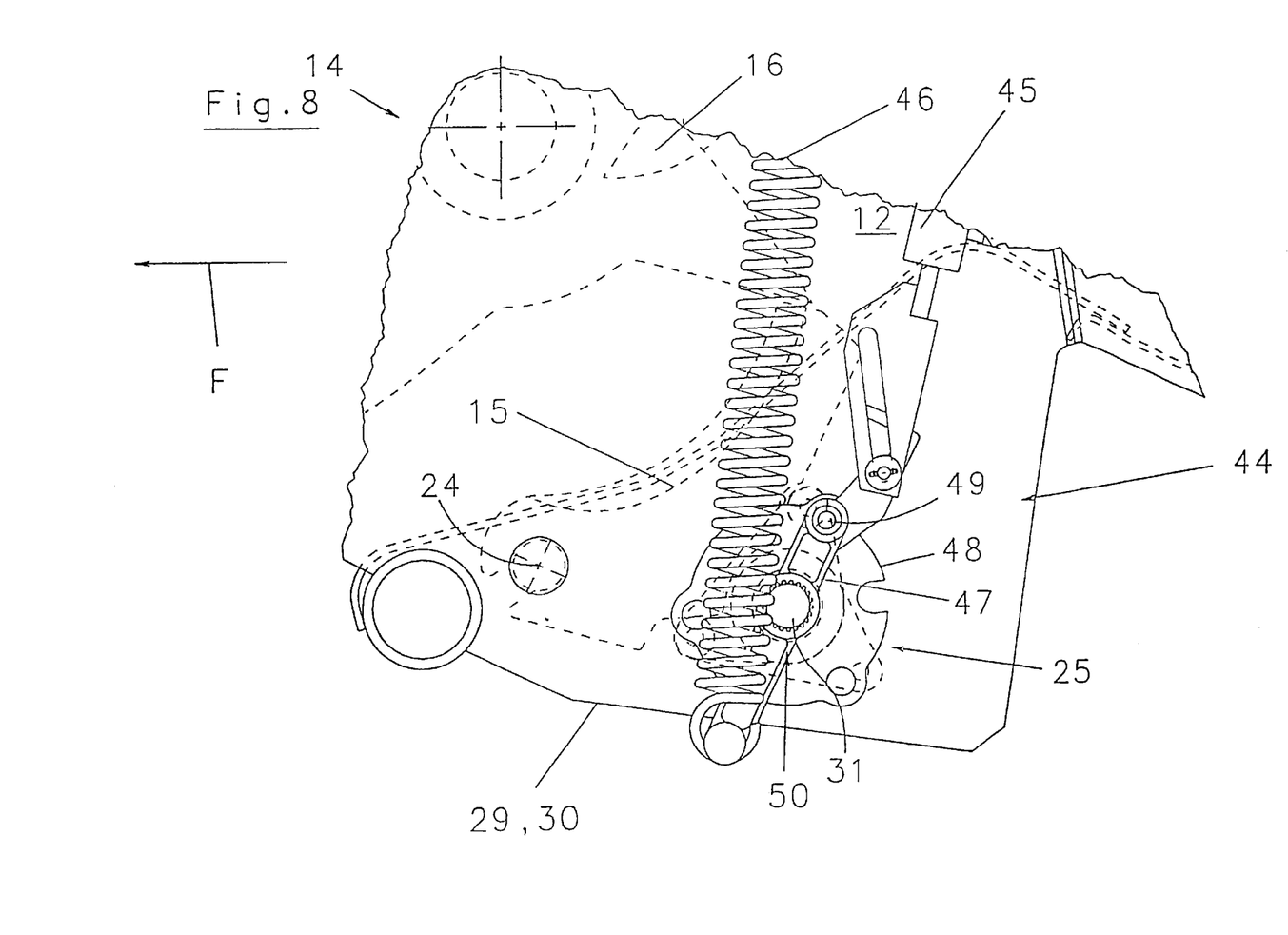
FIG. 8 is a view similar to FIG. 2, in which the cutting blades are moved into a non-cutting position by means of a hydraulic control setting.

FIG. 8 contains an illustration of a control device 44, by means of which the control shaft 31 and therefore also the support and control members 25 can be switched from a control position to an intermediate position (cutting blade 0 position). To this end, the control device 44 comprises a hydraulic piston cylinder arrangement 45, a tension spring 46 and a control lever 47, which can be connected to a round plate 48 affixed to the control shaft 31. If, for instance, the control lever 47 is connected to the round plate 48 by means of a bolt 49, a cutting blade 0 position can be effected by exerting pressure on the hydraulic piston cylinder arrangement 45. If, however, the control lever 47 is not connected to the round plate 48, the control shaft 31, together with the support and control members 25, can be manually rotated, thereby changing the cutting length of the cutting device 11, by means of, for instance, a setting key that can be plugged into a groove toothing 50 of the control shaft 31 (see also FIG. 2).

With regard to the support effect exerted by the support and control members 25 on the cutting blades 15, it must still be mentioned that the support and control members 25 exert a strong supporting force on the backwards supporting edges 28 of the cutting blades 15 in the starting position. Upon encountering an excessive load on the cutting blades 15, caused for instance by a foreign object in the conveyor channel 12, the rotation of the corresponding support and control member 25 in the rotation direction D2 (FIGS. 3 through 5) diminishes the supporting force to such a degree that the cutting blades will not sustain any major damage upon encountering a foreign object.

What is claimed is:

1. A cutting device for agricultural harvesting machines, comprising:

a conveyor channel, in which a number of cutting blades mounted in rotatable fashion, arranged at least in a single row and protruding into the conveyor channel in a cutting position interact with a driven rotating conveyor mechanism equipped with conveying prongs and aligned along a horizontal axis crosswise to the travel and work direction for the purpose of cutting stalk products, a support mechanism providing elastic support to each individual cutting blade in the cutting position, a control device for releasing the support mechanism and thereby allowing all or a number of cutting blades to rotate into a non-cutting position, and a support and control member mounted in rotatable fashion and aligned about an axis parallel to a rotation axis of the corresponding cutting blade assigned to each cutting blade for the purpose of providing elastic support to each individual cutting blade in the cutting position and for allowing the cutting blade to rotate out of the cutting position into the non-cutting position, the support and control members being mounted in rotatable fashion to a control shaft aligned crosswise to the travel direction, each individual support and control member being elastically connected to the control shaft by an energy accumulator.

2. A cutting device for agricultural harvesting machines according to claim 1, the support and control members are designed such that at least three control positions can be set in one revolution of the axis.

3. A cutting device for agricultural harvesting machines according to claim 1 wherein the support and control members are designed such that an intermediate position located between the respective control positions can be set in one revolution of the axis.

4. A cutting device for agricultural harvesting machines according to claim 1 wherein the support and control members are designed such that, in one revolution of the axis, at least two control positions can be set for providing elastic support to the corresponding cutting blades in the cutting position and one control position for allowing the corresponding cutting blades to rotate out of the cutting position into the non-cutting position.

5. A cutting device for agricultural harvesting machines according to claim 1 wherein in the intermediate position of the support and control member, the corresponding cutting blade can also be rotated out of the cutting position into the non-cutting position.

6. A cutting device for agricultural harvesting machines according to claim 1 wherein each of the control positions can be reached by rotating the support and control members by one angular pitch at a time.

7. A cutting device for agricultural harvesting machines according to claim 1 wherein the angular pitch between the control positions measures 120 degrees.

8. A cutting device for agricultural harvesting machines according to claim 1 wherein the support and control member has a number of support rolls that is at least one less than the number of possible control positions.

9. A cutting device for agricultural harvesting machines according to claim 1 wherein the support and control member comprises at least two support rolls, one of the support rolls interacts with a backwards supporting edge of the corresponding cutting blade in a control position for providing elastic support to the cutting blades in the cutting position.

10. A cutting device for agricultural harvesting machines according to claim 1 wherein the support and control members of adjacent cutting blades are staggered in relation to each other by at least one angular pitch.

11. A cutting device for agricultural harvesting machines according to claim 1, wherein the energy accumulator is designed as a torsion spring.

12. A cutting device for agricultural harvesting machines according to claim 1 wherein, in a base position, the support and control members rest against a stop element on the control shaft.

13. A cutting device for agricultural harvesting machines according to claim 1 wherein the support and control member comprises a roughly triangular carrier segment and has a hub for mounting to the control shaft.

14. A cutting device for agricultural harvesting machines according to claim 13 wherein the carrier segment has the shape of an isosceles triangle with rounded corners.

15. A cutting device for agricultural harvesting machines according to claim 8, wherein one support roll is mounted in rotatable fashion in the area of the angle between the base side and one lateral side.

16. A cutting device for agricultural harvesting machines according to claim 15, wherein the support and control member comprises a roughly triangular carrier segment and has a hub for mounting to the control shaft and the hub of the support and control member is mounted in the area of the angle between the two lateral sides.

17. A cutting device for agricultural harvesting machines according to claim 1, wherein a separate energy accumulator is assigned to each individual support and control member.

18. A cutting device for agricultural harvesting machines; comprising:
   a conveyor channel through which cut agricultural material passes;
   rotatable cutting blades each arranged to move between a cutting position in which said cutting blade is arranged in said conveyor channel and a non-cutting position in which said cutting blade is not situated in said conveyor channel, agricultural material being moved in said conveyor channel into contact with said cutting blades when said cutting blades are in the cutting position;
   support and control members each providing elastic support to a respective one of said cutting blades when said cutting blade is in the cutting position and enabling movement of said cutting blade from the cutting position to the non-cutting position such that some or all of said cutting blades are movable from the cutting position to the non-cutting position;
   a control shaft, said support and control members being rotatably mounted to said control shaft; and
   connecting means for elastically connecting each of said support and control members to said control shaft.

19. A cutting device for agricultural harvesting machines according to claim 18, wherein each of said support and control members is rotatable and aligned about an axis parallel to a rotation axis of the respective one of said cutting blades.

20. A cutting device for agricultural harvesting machines according to claim 18, wherein said cutting blades are arranged in a single row.

21. A cutting device for agricultural harvesting machines according to claim 18, wherein said cutting blades are situated below said conveyor channel when in the non-cutting position.

22. A cutting device for agricultural harvesting machines according to claim 18, further comprising conveying means for conveying agricultural material in said conveyor channel into contact with said cutting blades when said cutting blades are in the cutting position.

23. A cutting device for agricultural harvesting machines according to claim 22, wherein said conveying means comprise a conveyor mechanism having prongs.

24. A cutting device for agricultural harvesting machines according to claim 18, wherein each of said support and control members is rotatable about an axis and structured and arranged to enable at least three control positions of the respective one of said cutting blades to be set in one rotation of said support and control member about the axis.

25. A cutting device for agricultural harvesting machines according to claim 24, wherein each of the at least three control positions is obtainable by rotation of said support and control member one angular pitch at a time.

26. A cutting device for agricultural harvesting machines according to claim 25, wherein the angular pitch between the at least three control positions is 120 degrees.

27. A cutting device for agricultural harvesting machines according to claim 24, wherein each of said support and control members is structured and arranged to enable an intermediate position located between the respective control positions to be set in one rotation of said support and control member about the axis.

28. A cutting device for agricultural harvesting machines according to claim 27, wherein when said control and support member is in the intermediate position, the respective one of said cutting blades is rotatable from the cutting position to the non-cutting position.

29. A cutting device for agricultural harvesting machines according to claim 18, wherein each of said support and control members is rotatable about an axis and structured and arranged to enable at least two control positions of the respective one of said cutting blades to be set in which said support and control member provides elastic support with said cutting blade being in the cutting position and enable one control position to be set in which the respective one of said cutting blades is able to rotate out of the cutting position into the non-cutting position.

30. A cutting device for agricultural harvesting machines according to claim 18, wherein each of said support and control members is rotatable about an axis and structured and arranged to enable a plurality of control positions of the respective one of said cutting blades to be set upon rotation of said support and control member about the axis.

31. A cutting device for agricultural harvesting machines according to claim 30, wherein each of said support and control members includes a number of support rolls which is at least one less than the number of control positions, each of said support rolls being arranged to interact with a rear supporting edge of the respective one of said cutting blades to thereby provide elastic support to the respective one of said cutting blades when said cutting blade is in the cutting position.

32. A cutting device for agricultural harvesting machines according to claim 30, wherein at least one of said support and control members includes at least two support rolls, one of said support rolls interacting with a rear supporting edge of the respective one of said cutting blades in one of the control positions in which said support and control member provides elastic support to the respective one of said cutting blades when said cutting blade is in the cutting position.

33. A cutting device for agricultural harvesting machines according to claim 18, wherein said support and control members of adjacent ones of said cutting blades are staggered in relation to each other by at least one angular pitch.

34. A cutting device for agricultural harvesting machines according to claim 18, wherein at least one of said connecting means comprises a torsion spring.

35. A cutting device for agricultural harvesting machines according to claim 18, further comprising a stop element arranged on said control shaft and against which said support and control members rest in a base position.

36. A cutting device for agricultural harvesting machines according to claim 18, wherein at least one of said support and control members comprises a substantially triangular carrier segment and includes a hub for mounting said carrier segment to said control shaft.

37. A cutting device for agricultural harvesting machines according to claim 36, wherein said carrier segment has a shape of an isosceles triangle with rounded corners.

38. A cutting device for agricultural harvesting machines according to claim 36, wherein said at least one of said support and control members comprises a support roll rotatably mounted in an area of an angle between a base side and a lateral side of said carrier segment.

39. A cutting device for agricultural harvesting machines according to claim 36, wherein said hub is mounted in an area of an angle between two lateral sides of said carrier segment.

40. A cutting device for agricultural harvesting machines according to claim 18, wherein at least one of said support and control members comprises a carrier segment and a support roll rotatably mounted to said carrier segment.

41. A cutting device for agricultural harvesting machines according to claim 40, wherein said at least one support and control member further comprises a stud bolt connected to said carrier segment and a bearing bush interposed between said support roll and said stud bolt.

42. A cutting device for agricultural harvesting machines according to claim 18, further comprising a control drive coupled to said control shaft for changing a position of said control shaft and thus the cutting position of said cutting blades.

43. A cutting device for agricultural harvesting machines according to claim 42, wherein said control device comprises a control lever coupled to said control shaft, a tension spring connected to one end of said control lever and a expandable piston connected to an opposite end of said control lever.

44. A cutting device for agricultural harvesting machines, comprising:
   a conveyor channel through which cut agricultural material passes;
   cutting blades each arranged to move between a cutting position in which said cutting blade is arranged in said conveyor channel and a non-cutting position in which said cutting blade is not situated in said conveyor channel;
   support and control means for providing elastic support to each of said cutting blades when said cutting blade is in the cutting position and enabling movement of said cutting blade from the cutting position to the non-cutting position such that some or all of said cutting blades are movable from the cutting position to the non-cutting position;
   a control shaft, said support and control means being rotatably mounted to said control shaft; and
   connecting means for elastically connecting each of said support and control means to said control shaft.

45. A cutting device for agricultural harvesting machines according to claim 44, wherein said support and control means each comprise a rotatable support and control member aligned about an axis parallel to a rotation axis of the respective one of said cutting blades.

46. A cutting device for agricultural harvesting machines according to claim 45, wherein each of said support and control members is rotatable about an axis and structured and arranged to enable at least three control positions of the respective one of said cutting blades to be set in one rotation of said support and control member about the axis.

47. A cutting device for agricultural harvesting machines according to claim 46, wherein each of said support and control members includes a number of support rolls which is at least one less than the number of control positions, each of said support rolls being arranged to interact with a rear supporting edge of the respective one of said cutting blades to thereby provide elastic support to the respective one of said cutting blades when said cutting blade is in the cutting position.

48. A cutting device for agricultural harvesting machines according to claim 46, wherein at least one of said support and control members includes at least two support rolls, one of said support rolls interacting with a rear supporting edge of the respective one of said cutting blades in one of the control positions in which said support and control member provides elastic support to the respective one of said cutting blades when said cutting blade is in the cutting position.

49. A cutting device for agricultural harvesting machines according to claim 45, wherein each of said support and control members is rotatable about an axis and structured and arranged to enable at least two control positions of the respective one of said cutting blades to be set in which said support and control member provides elastic support with said cutting blade being in the cutting position and enable one control position to be set in which the respective one of said cutting blades is able to rotate out of the cutting position into the non-cutting position.

50. A cutting device for agricultural harvesting machines according to claim 45, wherein said support and control members of adjacent ones of said cutting blades are staggered in relation to each other by at least one angular pitch.

51. A cutting device for agricultural harvesting machines according to claim 44, wherein at least one of said connecting means comprises a torsion spring.

52. A cutting device for agricultural harvesting machines according to claim 44, further comprising a stop element arranged on said control shaft and against which said support and control means rest in a base position.

53. A cutting device for agricultural harvesting machines according to claim 44, wherein at least one of said support and control means comprises a carrier segment and includes a hub for mounting said carrier segment to said control shaft.

54. A cutting device for agricultural harvesting machines according to claim 44, wherein at least one of said support and control means comprises a carrier segment and a support roll rotatably mounted to said carrier segment.

55. A cutting device for agricultural harvesting machines according to claim 54, wherein said at least one support and control means further comprises a stud bolt connected to said carrier segment and a bearing bush interposed between said support roll and said stud bolt.

56. A cutting device for agricultural harvesting machines according to claim 44, further comprising a control drive coupled to said control shaft for changing a position of said control shaft and thus the cutting position of said cutting blades.

57. A cutting device for agricultural harvesting machines according to claim 56, wherein said control device comprises a control lever coupled to said control shaft, a tension spring connected to one end of said control lever and a expandable piston connected to an opposite end of said control lever.

58. A cutting device for agricultural harvesting machines; comprising:

a conveyor channel through which cut agricultural material passes;

rotatable cutting blades each arranged to move between a cutting position in which said cutting blade is arranged in said conveyor channel and a non-cutting position in which said cutting blade is not situated in said conveyor channel, agricultural material being moved in said conveyor channel into contact with said cutting blades when said cutting blades are in the cutting position; and support and control members each providing elastic support to a respective one of said cutting blades when said cutting blade is in the cutting position and enabling movement of said cutting blade from the cutting position to the non-cutting position such that some or all of said cutting blades are movable from the cutting position to the non-cutting position;

each of said support and control members being rotatable about an axis and structured and arranged to enable at least three control positions of the respective one of said cutting blades to be set in one rotation of said support and control member about the axis.

59. A cutting device for agricultural harvesting machines; comprising:

a conveyor channel through which cut agricultural material passes;

rotatable cutting blades each arranged to move between a cutting position in which said cutting blade is arranged in said conveyor channel and a non-cutting position in which said cutting blade is not situated in said conveyor channel, agricultural material being moved in said conveyor channel into contact with said cutting blades when said cutting blades are in the cutting position; and support and control members each providing elastic support to a respective one of said cutting blades when said cutting blade is in the cutting position and enabling movement of said cutting blade from the cutting position to the non-cutting position such that some or all of said cutting blades are movable from the cutting position to the non-cutting position;

each of said support and control members being rotatable about an axis and structured and arranged to enable a plurality of control positions of the respective one of said cutting blades to be set upon rotation of said support and control member about the axis, at least one of said support and control members including at least two support rolls, one of said support rolls interacting with a rear supporting edge of the respective one of said cutting blades in one of the control positions in which said support and control member provides elastic support to the respective one of said cutting blades when said cutting blade is in the cutting position.

60. A cutting device for agricultural harvesting machines; comprising:

a conveyor channel through which cut agricultural material passes; rotatable cutting blades each arranged to move between a cutting position in which said cutting blade is arranged in said conveyor channel and a non-cutting position in which said cutting blade is not situated in said conveyor channel, agricultural material being moved in said conveyor channel into contact with said cutting blades when said cutting blades are in the cutting position; and support and control members each providing elastic support to a respective one of said cutting blades when said cutting blade is in the cutting position and enabling movement of said cutting blade from the cutting position to the non-cutting position such that some or all of said cutting blades are movable from the cutting position to the non-cutting position;

said support and control members of adjacent ones of said cutting blades being staggered in relation to each other by at least one angular pitch.

61. A cutting device for agricultural harvesting machines; comprising:

a conveyor channel through which cut agricultural material passes;

rotatable cutting blades each arranged to move between a cutting position in which said cutting blade is arranged in said conveyor channel and a non-cutting position in which said cutting blade is not situated in said conveyor channel, agricultural material being moved in said conveyor channel into contact with said cutting blades when said cutting blades are in the cutting position;

support and control members each providing elastic support to a respective one of said cutting blades when said cutting blade is in the cutting position and enabling movement of said cutting blade from the cutting position to the non-cutting position such that some or all of said cutting blades are movable from the cutting position to the non-cutting position;

a control shaft, said support and control members being rotatably mounted to said control shaft; and a stop element arranged on said control shaft and against which said support and control members rest in a base position.

62. A cutting device for agricultural harvesting machines; comprising:

a conveyor channel through which cut agricultural material passes;

rotatable cutting blades each arranged to move between a cutting position in which said cutting blade is arranged in said conveyor channel and a non-cutting position in which said cutting blade is not situated in said conveyor channel, agricultural material being moved in said conveyor channel into contact with said cutting blades when said cutting blades are in the cutting position;

support and control members each providing elastic support to a respective one of said cutting blades when said cutting blade is in the cutting position and enabling movement of said cutting blade from the cutting position to the non-cutting position such that some or all of said cutting blades are movable from the cutting position to the non-cutting position;

a control shaft, said support and control members being rotatably mounted to said control shaft; and at least one of said support and control members comprising a carrier segment and a support roll rotatably mounted to said carrier segment.

63. A cutting device for agricultural harvesting machines; comprising:

a conveyor channel through which cut agricultural material passes;

rotatable cutting blades each arranged to move between a cutting position in which said cutting blade is arranged in said conveyor channel and a non-cutting position in which said cutting blade is not situated in said conveyor channel, agricultural material being moved in said conveyor channel into contact with said cutting blades when said cutting blades are in the cutting position;

support and control members each providing elastic support to a respective one of said cutting blades when said cutting blade is in the cutting position and enabling movement of said cutting blade from the cutting position to the non-cutting position such that some or all of said cutting blades are movable from the cutting position to the non-cutting position; and a control drive coupled to said control shaft for changing a position of said shaft and thus the cutting position of said cutting blades.

* * * * *